US012545456B2

(12) United States Patent
Roos et al.

(10) Patent No.: US 12,545,456 B2
(45) Date of Patent: Feb. 10, 2026

(54) SPLICE MECHANISM FOR A PACKAGING ASSEMBLY (71) Applicant: TNA Australia Pty Limited, Lidcombe (AU)

(72) Inventors: Lawrence Roos, Sydney (AU); Kerryn Thomas Ball, Sydney (AU)

(73) Assignee: TNA Australia Pty Limited, Lidcombe (AU)

( * ) Notice: Subject to any disclaimer, the term of this patent is extended or adjusted under 35 U.S.C. 154(b) by 180 days.

(21) Appl. No.: 18/555,722

(22) PCT Filed: Apr. 20, 2021

(86) PCT No.: PCT/AU2021/050351
§ 371 (c)(1),
(2) Date: Oct. 16, 2023

(87) PCT Pub. No.: WO2022/221901
PCT Pub. Date: Oct. 27, 2022

(65) Prior Publication Data
US 2024/0199255 A1    Jun. 20, 2024

(51) Int. Cl.
*B65B 41/16*     (2006.01)
*B65B 9/207*     (2012.01)
(Continued)

(52) U.S. Cl.
CPC .............. *B65B 41/16* (2013.01); *B65B 9/207* (2013.01); *B65B 51/306* (2013.01); *B65B 57/04* (2013.01);
(Continued)

(58) Field of Classification Search
CPC ....... B65B 41/16; B65B 9/207; B65B 51/306; B65B 57/04; B65B 19/18; B65B 20/12;
(Continued)

(56) References Cited

U.S. PATENT DOCUMENTS

| | | | |
|---|---|---|---|
| 4,116,399 A | | 9/1978 | Mosburger et al. |
| 4,467,589 A | * | 8/1984 | van Maanen ........... B65B 57/02 |
| | | | 53/550 |

(Continued)

FOREIGN PATENT DOCUMENTS

| | | | | |
|---|---|---|---|---|
| GB | 1241903 A | | 8/1971 | |
| GB | 2510855 A | * | 8/2014 | ........... B65H 16/106 |

(Continued)

OTHER PUBLICATIONS

Search Report and Written Opinion issued for Spanish Patent Application No. 202390143, Dated Apr. 29, 2024, 8 Pages.
(Continued)

*Primary Examiner* — George R Koch
(74) *Attorney, Agent, or Firm* — Husch Blackwell LLP (57) ABSTRACT A splice mechanism (100) for a packaging assembly (10), the packaging assembly (10) including: a former shoulder (12); a controller (14); a film drive (16) controlled by the controller (14) for feeding a film (112) at a film speed to the former shoulder (12) to form a tubular film (22) moving in a film direction (20); a sealing device (24) to seal the tubular film (22) in a first sealing direction (26), the first sealing direction (26) being parallel to the film direction (20); a set of jaws (28) controlled by the controller (14) and movable at a jaw speed to engage and seal the tubular film (22) in a second sealing direction (30) to form a first seal (32) and a second seal (34) in each bag, thereby forming a closed bag (36), the splice mechanism (100) including: an active film roll (110) from which film (112) is drawn to be fed to the former shoulder (12) by the film drive (16); a second film roll (120) having film (122) for feeding to the former shoulder (12); a film roll holder (130) holding the active film roll (110) and the second film roll (120) such that film (112) from the active film roll (110) extends along a film path (140) to the former shoulder (12) and the second film roll
(Continued)

(120) is accessible; a splice roller (150) against which film (122) from the second film roll (120) is placed, the film (122) having a film end (124), the film end (124) having an adhesive (126), the splice roller (150) being movable between a free position, wherein the film path (140) is unimpeded by the splice roller (150), and a splice position, wherein the film path (140) is tangential to the splice roller (150) at a splice point (142) on the film path (140).

15 Claims, 10 Drawing Sheets

(51) Int. Cl.
*B65B 51/30* (2006.01)
*B65B 57/04* (2006.01)
*B65H 19/18* (2006.01)
*B65H 20/12* (2006.01)

(52) U.S. Cl.
CPC ............ *B65H 19/18* (2013.01); *B65H 20/12* (2013.01); *B65H 2301/46022* (2013.01); *B65H 2301/4607* (2013.01); *B65H 2301/4631* (2013.01); *B65H 2301/46414* (2013.01)

(58) Field of Classification Search
CPC .. B65B 2301/46022; B65B 2301/4607; B65B 2301/4631; B65B 2301/46414
See application file for complete search history.

(56) References Cited

U.S. PATENT DOCUMENTS

| | | | |
|---|---|---|---|
| 2003/0089816 A1* | 5/2003 | Hanson | B65H 19/1889 242/559 |
| 2010/0043350 A1* | 2/2010 | Tsuruta | B65B 41/16 493/193 |
| 2010/0186879 A1* | 7/2010 | Machamer | B65H 19/20 156/159 |
| 2020/0108958 A1 | 4/2020 | Shimoda et al. | |

FOREIGN PATENT DOCUMENTS

| | | | | |
|---|---|---|---|---|
| JP | H0597123 A | | 4/1993 | |
| JP | H0958616 A | * | 3/1997 | |
| JP | 2020059508 A | | 4/2020 | |
| WO | WO-2015111571 A1 | * | 7/2015 | ......... B65H 19/1852 |

OTHER PUBLICATIONS

Office Action issued by Japan Patent Office for corresponding Japanese Patent Application No. 2023-559071 along with English machine translation, dated Nov. 7, 2024, 13 pages.

* cited by examiner

SPLICE MECHANISM FOR A PACKAGING ASSEMBLY

This application is a national stage application claiming priority to PCT International Patent Application No. PCT/AU2021/050351 filed Apr. 20, 2021, titled "Splice Mechanism for a Packaging Assembly," which is hereby fully incorporated by reference as if set forth fully herein.

FIELD

The present invention relates to a splicer for a packaging assembly, and a packaging assembly using the splicer.

BACKGROUND

Packaging assemblies have, due to commercial pressures, become faster and faster in their task of converting flat film to tubular film, filling the tubular film with product, and sealing the tubular film into discrete bags. As a result, packaging assemblies consume rolls of film much faster than would have been the case previously. The act of attaching the leading film end of a second film roll to the trailing film end of an active film roll is splicing, and consumes a large amount of time during which the machine is usually slowed down, or even stopped.

It would be desirable to automate the splicing process.

SUMMARY OF INVENTION

It is an object of the present invention to address or overcome one or more of the above disadvantages, or at least provide a useful alternative to the above-mentioned manual splicing processes.

In a first aspect, the present invention provides a splice mechanism for a packaging assembly, the packaging assembly including:
  a former shoulder;
  a controller;
  a belt drive controlled by the controller for feeding a film at a film speed to the former shoulder to form a tubular film moving in a film direction;
  a sealing device to seal the tubular film in a first sealing direction, the first sealing direction being parallel to the film direction;
  a set of jaws controlled by the controller and movable at a jaw speed to engage and seal the tubular film in a second sealing direction to form a first seal and a second seal in each bag, thereby forming a closed bag,
the splice mechanism including:
  a film roll holder for holding an active film roll from which film is drawn to be fed to the former shoulder and a second film roll having film for feeding to the former shoulder, wherein film from the active film roll extends along a film path to the former shoulder and the second film roll is accessible;
  a splice roller against which film from the second film roll is placed, the film having a film end, the film end having an adhesive, the splice roller being movable between a free position, wherein the film path is unimpeded by the splice roller, and a splice position, wherein the film path is tangential to the splice roller at a splice point on the film path.

In a second aspect, the present invention provides a splice mechanism for a packaging assembly, the packaging assembly including:
  a former;
  a controller;
  a belt drive controlled by the controller for feeding a film at a film speed to the former in a film direction;
the splice mechanism including:
  a film roll holder for holding an active film roll from which film is drawn to be fed to the former and a second film roll having film for feeding to the former, wherein film from the active film roll extends along a film path to the former shoulder and the second film roll is accessible;
  a splice roller against which film from the second film roll is placed, the film having a film end, the film end having an adhesive, the splice roller being movable between a free position, wherein the film path is unimpeded by the splice roller, and a splice position, wherein the film path is tangential to the splice roller at a splice point on the film path.

Preferably, the mechanism further includes a first pinch drive mechanism locatable along the film path between the active film roll and the former shoulder, the first pinch drive mechanism having a first pinch roller and a second pinch roller positioned such that the pinch rollers engage and draw the film from the active film roll at the film speed,
  wherein, when the splice roller is in the splice position, the splice roller and the first pinch roller are adjacent each other such that the film of the active film roll and the film of the second film roll is engaged by the splice roller and the first pinch roller, and
  wherein, when the splice roller is in the splice position, the first pinch drive mechanism drives the film opposite the film direction.

Preferably, the mechanism further includes:
  a film calendar locatable between the active film roll and the former shoulder having a set of stationary rollers, and a set of movable rollers that are mounted on a movable calendar arm, with the film path rounding the stationary and movable rollers alternatingly such that movement of the calendar arm along an arm path changes a length of the film path through the film calendar,
  a second pinch drive mechanism locatable between the film calendar and the former shoulder, the second pinch drive mechanism having a first pinch roller and a second pinch roller positioned such that the pinch rollers engage and draw the film from the film calendar,
  wherein, when the splice roller is moved to the splice position, the calendar arm moves along the arm path to reduce the length of the film path through the calendar as film is fed to the former shoulder, such that the film speed through the second pinch drive mechanism is higher than the film speed at the splice point.

Preferably, the splice roller is further movable to a load position between the free position and the splice position, and
  the film includes a set of regularly spaced registration marks and the splice mechanism further includes:
  a splice actuator to move the splice roller between a load position and the splice position;
  a registration mark sensor locatable between the film calendar and the former shoulder, the registration mark sensor configured to provide a registration signal to the controller, the registration signal being indicative of whether a registration mark of said set of regularly spaced registration indexation marks is present on the active film at a sensor point on the film path adjacent the registration mark sensor;

a film roll spindle mounted on the film roll holder for supporting the active film roll;

a brake associated with the film roll spindle to resist the drawing of film from the active film roll; and a speed sensor associated with the film roll spindle configured to provide a spindle speed signal to the controller, the spindle speed signal being indicative of the rotational speed of the active film roll, wherein the controller is configured to:

determine when the active film roll has run out of film by determining whether the spindle signal drops below a predetermined threshold;

determine the film path between the sensor point and the splice point based on at least predetermined information on the film path; and determine a number of registration marks on the active film between the splice point and a film end of the film previously drawn from the active film roll;

operate the splice actuator to move the splice roller from the load position to the splice position when the number of registration marks between the splice point and the film end is below a predetermined threshold.

Preferably, the film calendar further includes an arm sensor adapted to provide an arm signal to the controller, the arm signal being indicative of a position of the movable calendar arm along the arm path, and wherein the controller is configured to determine the film path between the sensor point and the splice point based on at least the calendar arm position along the arm path.

Preferably, the controller is adapted to determine the position of the set of registration marks on the active film along the film path and operate the splice actuator to move the splice roller from the load position to the splice position to align the registration marks on the active film with a known position of registration marks on the film end.

Preferably, the mechanism further includes a vacuum roller positioned between the free position and the splice position of the splice roller such that the splice roller moves circumferentially about the vacuum roller between the free position and the splice position, wherein the vacuum roller includes a cavity that is maintained at lower than ambient pressure, and a perforated surface in fluid communication with the cavity, wherein the perforated surface is adapted to retain the film end against the vacuum roller while the adhesive is applied to the film end.

Preferably, the splice roller is further movable to a load position between the free position and the splice position, and wherein the vacuum roller includes an adhesive release surface adjacent the perforated surface; and the adhesive is an adhesive tape having an adhesive side and a non-adhesive side, wherein said adhesive tape is applied with the adhesive side facing the vacuum roller to span the film end retained against the vacuum roller and the release surface and, when the splice roller is moved from the free position to the load position, the splice roller engages a side of the film that is opposite the adhesive side of the adhesive.

Preferably, the splice roller is manually movable between the free position and the load position, and wherein the splice mechanism includes a splice actuator to move the splice roller between the load position and the splice position.

Preferably, the adhesive release surface includes a plurality of raised surface features.

Preferably, the plurality of raised surface projections includes cylindrical hemispherical or semi-hemispherical bosses of about 0.2 mm to 5 mm height and 0.2 mm to 5 mm diameter.

Preferably, the adhesive release surface includes a silicone surface.

Preferably, the splice mechanism further includes a splice roller shield that moves with the splice roller to allow access to the splice roller in the free position and inhibit access to the splice roller in the splice position.

Preferably, the film roll holder is movable such that the second film roll is movable to a position previously occupied by the active film roll, thereby becoming the active film roll.

Preferably, a position occupied by the second film roll is comparatively accessible and the position occupied by the active film roll is comparatively inaccessible.

In a second aspect, the present invention provides a packaging assembly including the splice mechanism of the first aspect.

BRIEF DESCRIPTION OF DRAWINGS

Preferred embodiments of the present invention will now be described, by way of examples only, with reference to the accompanying drawings.

DESCRIPTION OF EMBODIMENTS

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

Figure 1:
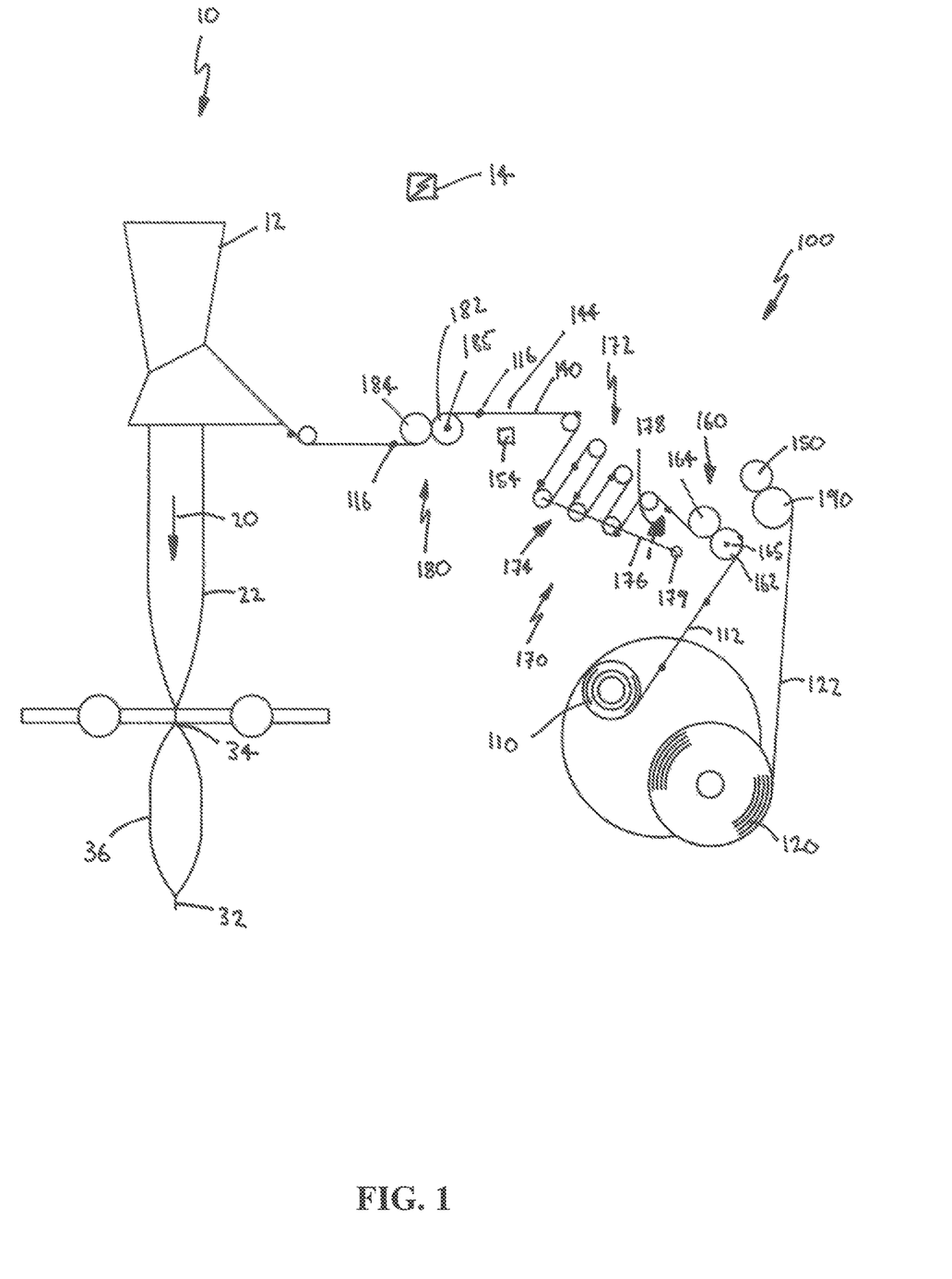
FIG. 1 shows a schematic diagram of a splice mechanism according to a preferred embodiment of the invention.
Figure 2:
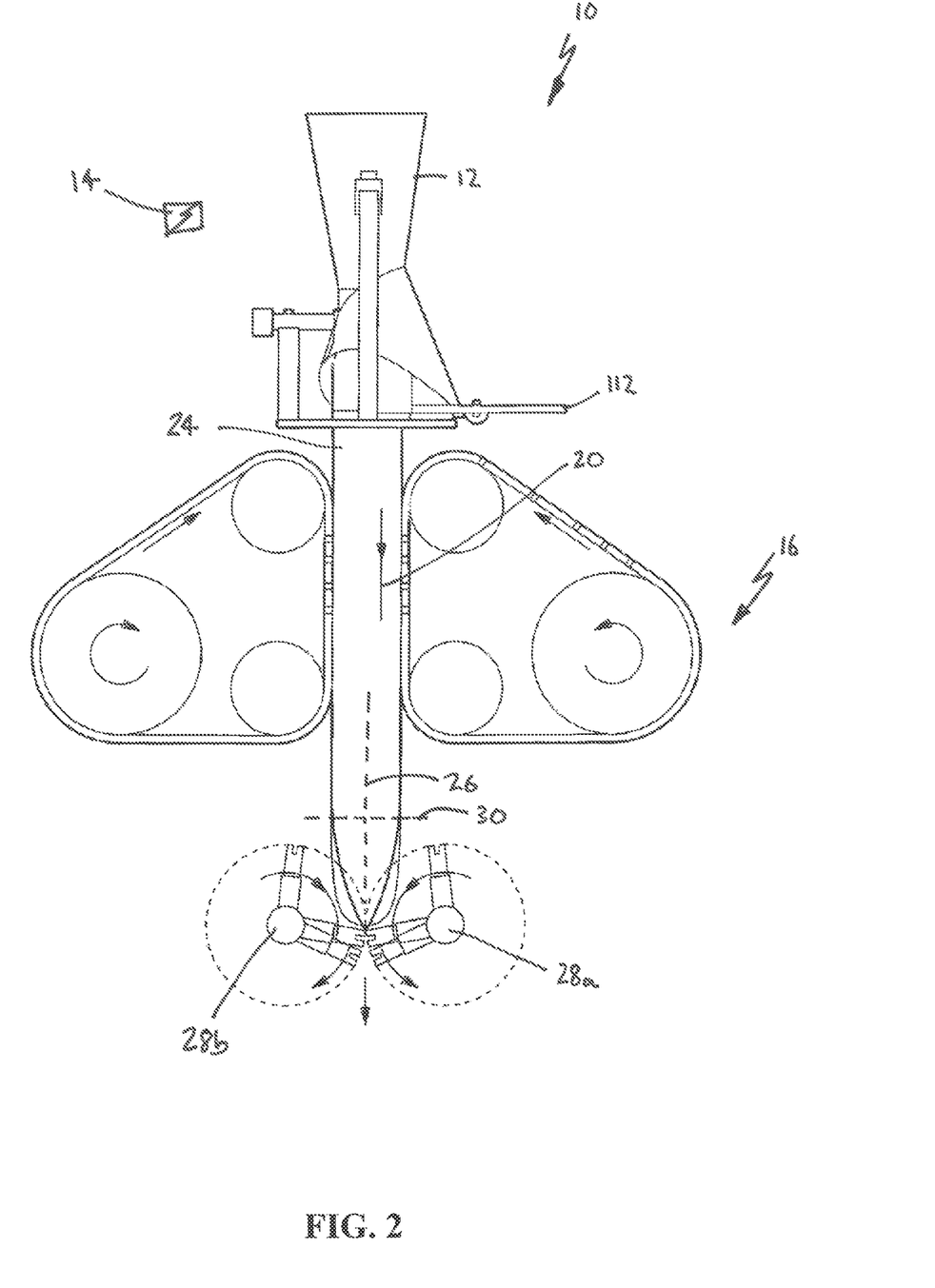
FIG. 2 shows a schematic diagram of a packaging assembly used with the splice mechanism of FIG. 1.

As seen in FIG. 1, a splice mechanism 100 according to a preferred embodiment of the invention is shown in which an active film roll 110 from which film, being an active film 112, is drawn to be fed to a former shoulder 12 of a packaging assembly 10. The packaging assembly 10 for which the splice mechanism 100 may be used is shown in more detail in FIG. 2. Notably, the packaging assembly 10 includes the former shoulder 12 that reconfigures the active film 112 to a tubular film 22 moving in a film direction 20. The packaging assembly 10 further includes a controller 14 to control a belt drive 16 for feeding the active film 112 at a film speed to the former shoulder 12 to form the tubular film 22. The packaging assembly 10 also includes a sealing device 24 to seal the tubular film 22 in a first sealing direction, the first sealing direction 26 being parallel to the film direction 20. The packaging assembly 10 also includes a set of jaws 28a, 28b controlled by the controller 14 and movable at a jaw speed to engage and seal the tubular film 22 in a second sealing direction 30 to form a first seal 32 and a second seal 34 in each bag 36, as shown in FIG. 1, thereby forming a closed bag.

Figure 3:
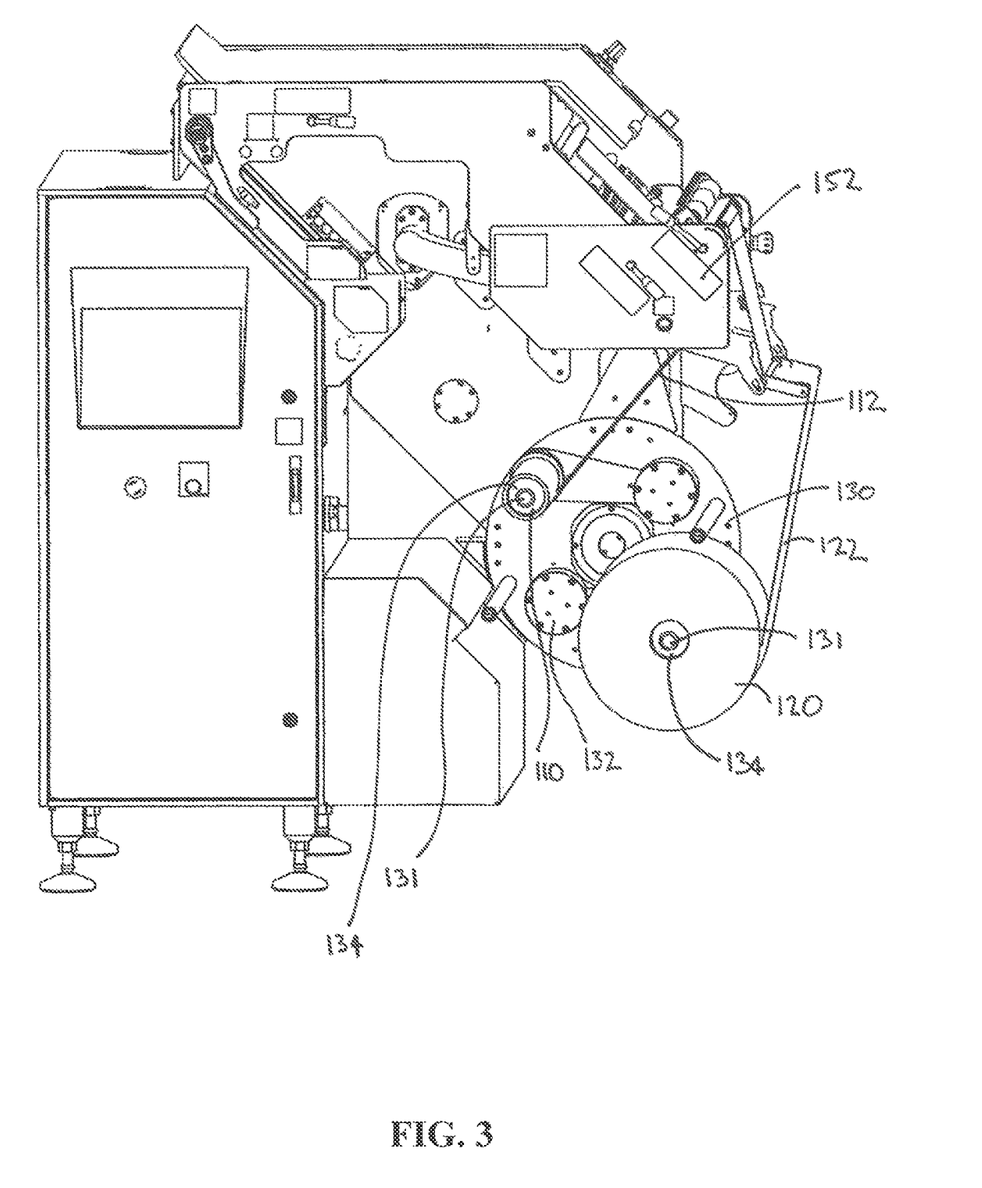
FIG. 3 shows a cut-away view of the splice mechanism of FIG. 1.
Figure 4:
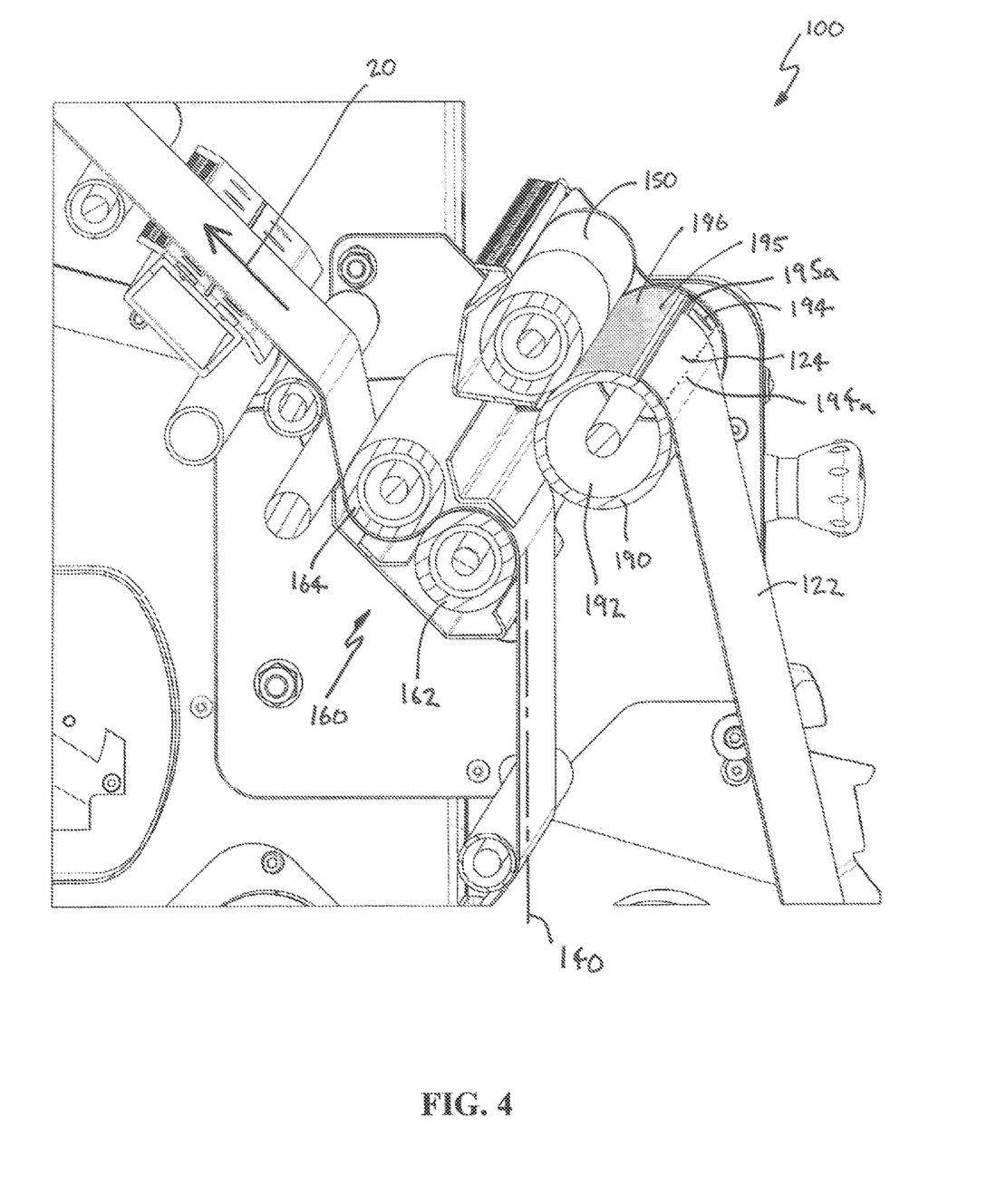
FIG. 4 shows a cut-away view of the splice mechanism of FIG. 1.

Moving to FIG. 3, the splice mechanism 100 is shown with a second film roll 120 having film, in this case second film 122, that is suitable for feeding to the former shoulder 12. The active film roll 110 and the second film roll 120 are held by a film roll holder 130 such that the active film 112 extends along a film path 140 to the former shoulder 12, shown in FIG. 1, and the second film roll 120 is accessible, such as for replacement, or insertion to the film roll holder 130. As can be seen, in this embodiment the film roll holder 130 includes a pair of spindles 131 for holding each of the film rolls. Moving to FIG. 4, the splice mechanism 100 further includes a splice roller 150, against which the second film 122 may be placed, the second film 122 having a film end 124, and the film end 124 having an adhesive applied thereto to allow the film end 124 to be applied to the active film 112. In this embodiment the adhesive is in the form of an adhesive tape 126 or film having an adhesive side 126a and a non-adhesive side, however in other embodiments an adhesive is pre-applied to a portion at the film end 124. The splice roller 150 is movable between a free position, such as shown in FIG. 4, wherein the film path 140 is unimpeded by the splice roller 150, and a splice position, such as shown in FIG. 8, wherein the film path 140 is tangential to the splice roller 150 at a splice point 142 on the film path.

Returning to FIG. 4, the splice mechanism 100 further includes a first pinch drive mechanism 160 locatable along the film path 140 between the active film roll 110 and the former shoulder 12. The first pinch drive mechanism 160 includes a first pinch roller 162 and a second pinch roller 164 positioned such that the pinch rollers 162, 164 engage the active film 112 to draw the active film 112 from the active roll 110. Preferably, the first pinch roller 162 is driven by a motor (not shown), alternatively both of the pinch rollers 162, 164 are driven by a motor (not shown) controlled by the controller 14. More preferably the motors driving the one or both rollers are servomotors.

The splice mechanism 100 further includes a first sensor 165 associated with the first pinch drive mechanism 160 for sensing information indicative of the film speed of the active film 112 passing through the first pinch drive mechanism 160. In this embodiment the first sensor 165 is integrated at least partially into the servomotor or servomotors driving the first and/or second pinch rollers 162, 164 which are controlled by the controller 14 to be driven at an angular velocity. This angular velocity may be used with known roller parameters, such as gearing ratios and roller diameter to calculate the velocity of the film speed of the active film 112 passing through the first pinch drive mechanism 160. In alternative embodiments the first sensor 165 may comprise a sensor module to directly read either the angular velocity of one or both of the first and second pinch rollers or the active film 112 adjacent or as it passes through the first pinch drive mechanism 160.

Figure 8:
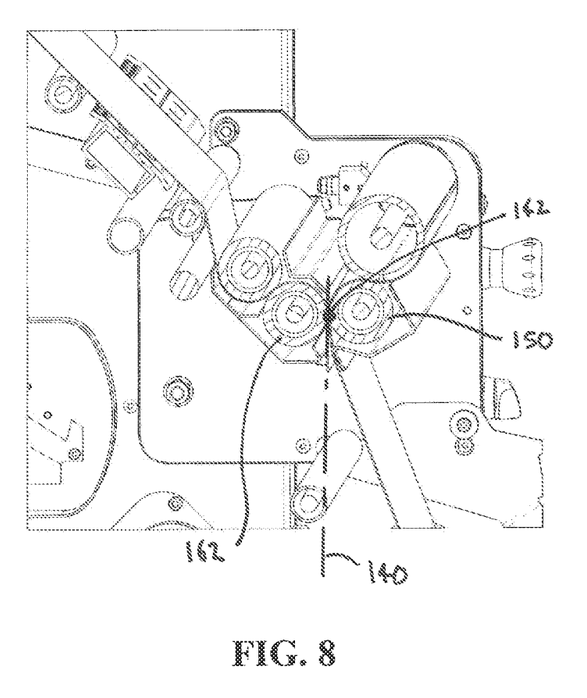
FIG. 8 shows a cut-away view of the splice mechanism of FIG. 1.

When the splice roller 150 is in the splice position shown in FIG. 8, the splice roller 150 and the first pinch roller 162 are adjacent each other such that the active film 112, or the active film 112 and the second film 122, is engaged by the splice roller 150 and the first pinch roller 162 such that pressure is applied by the splice roller 150 onto the films 112, 122 and preferably the adhesive tape 126.

Returning to FIG. 1, the splice mechanism 100 further includes a film calendar 170 locatable between the active film roll 110 and the former shoulder 12. The film calendar 170 includes a set of stationary rollers 172 and a set of movable rollers 174. The set of movable rollers 174 is mounted on a movable calendar arm 176 that is movable along an arm path 178. The film path 140 rounds the stationary rollers 172 and the movable rollers 174 alternatingly such that movement of the calendar arm 176 along an arm path 178 changes a length of the film path 140 through the film calendar.

The splice mechanism 100 also includes a second pinch drive mechanism 180 locatable between the film calendar 170 and the former shoulder 12. The second pinch drive mechanism includes a first pinch roller 182 and a second pinch roller 184 positioned such that the pinch rollers 182, 184 engage the active film 112 and the tangential speed of the pinch rollers 182, 184 at the contact surface with the active film 112 is equal to the film speed of the active film 112. Preferably one or both of the pinch rollers 182, 184 is driven by a motor (not shown) that is controlled by the controller 14. More preferably the motors driving the one or both rollers are servomotors. It should be noted that due to the ability of the film calendar 170 to change the length of the film path 140 between the first pinch drive mechanism 160 and the second pinch drive mechanism 180, the film speed of the active film 112 may be different at the first pinch drive mechanism 160 compared to the second pinch drive mechanism 180 as active film 112 is stored in, or released from, the film calendar 170.

Accordingly, the splice mechanism 100 further includes a second sensor 185 associated with the second pinch drive mechanism 180 for sensing information indicative of the film speed of the active film 112 passing through the second pinch drive mechanism 180. In this embodiment the first sensor 185 is integrated at least partially into the servomotor or servomotors driving the first and/or second pinch rollers 182, 184 which are controlled by the controller 14 to be driven at an angular velocity. This angular velocity may be used with known roller parameters, such as gearing ratios and roller diameter to calculate the velocity of the film speed of the active film 112 passing through the second pinch drive mechanism 180. In alternative embodiments the first sensor 185 may comprise a sensor module to directly read either the angular velocity of one or both of the first and second pinch rollers, or the active film 112 adjacent or as it passes through the second pinch drive mechanism 180. It will be appreciated therefor that by means of the first and second sensors 165, 185, the controller 14 has access to information regarding, and control over the film speed of the active film 112 at the first pinch drive mechanism 160 and the second pinch drive mechanism 180 as well as controlling the film calendar 170 to thereby enable the active film 112 to be stored in, or released from, the film calendar 170 as required.

The active film 112, and also the second film 122, includes a set of regularly spaced registration marks 116. The splice mechanism 100 includes a registration mark sensor 154 locatable between the film calendar 170 and the former shoulder 12. The registration mark sensor 154 is configured to provide a registration signal to the controller 14 that is indicative of whether the registration mark 116 is present on the active film 112 at a sensor point 144 along the film path 140. The sensor point 144 is adjacent the registration mark sensor 154.

The film calendar 170 further also includes an arm sensor 179 adapted to provide an arm signal to the controller 14, the arm signal being indicative of a position of the movable calendar arm 176 along the arm path 178.

Turning to FIG. 3, the splice mechanism 100 also includes at least one brake 132 located in the film roll holder 130 to resist drawing of active film 112 from the active film roll 110 or drawing of second film 122 from the second film roll 120. Preferably, the brake 132 includes an inductive brake 132 associated with each of the first and second spindles 131. In this embodiment each brake 132 is connected to the respective spindle via a belt drive and the resistance of each brake can be selectively varied. The resistance of each brake is selected to slow the angular velocity of the respective film roll, which may have substantial angular momentum, should a reduced rate or stoppage of film payout be necessary. Further, the splice mechanism 100 includes at least one spindle speed sensor 134 located in the film roll holder 130 and associated with each spindle 131. The spindle speed sensor or sensors 134 is/are configured to provide a spindle speed signal to the controller 14 that is indicative of a rotational speed of the active spindle and the active film roll 110, and in some embodiments also the second film roll 120, by drawing of the respective film 112, 122 from the respective film roll 110, 120.

Turning to FIG. 4, the splice mechanism 100 also includes a vacuum roller 190 for holding the second film against the splice roller 150. The vacuum roller 190 is positioned between the free position and the splice position of the splice roller 150, such that the splice roller 150 moves circumferentially about the vacuum roller 190 between the free position and the splice position. The vacuum roller 190 includes a cavity 192 that is maintained at lower than ambient pressure, and a perforated surface 194 in fluid communication with the cavity 192 such that the perforated surface 194 is adapted to retain the second film end 124 against the vacuum roller 190. In this embodiment the perforated surface is confined to a longitudinal vacuum strip extending axially along the surface of the vacuum roller 190 (seen extending from under the film end 124 in FIG. 4 and represented extending under the film end 124 by dotted line 194a). More preferably, micro perforations in the vacuum strip restrict airflow from the ambient surrounding through the perforations to the cavity 192 so that vacuum pressure in the cavity 192 is maintained. This is a preferable position in which to apply the second film end 124 which may be held against the perforated surface 194 by vacuum as can be seen in FIG. 4.

The vacuum roller 190 further includes an adhesive release surface 195 extending longitudinally along the vacuum roller adjacent the perforated strip 194. In this embodiment the release surface 195 comprises a plurality of surface projections 196 which include cylindrical and/or semi-hemispherical bosses of height between 0.2 mm to 5 mm and diameter between 0.2 mm to 5 mm. The adhesive release surface 195, including the surface projections 196, may be formed of a silicone rubber.

Figure 5:
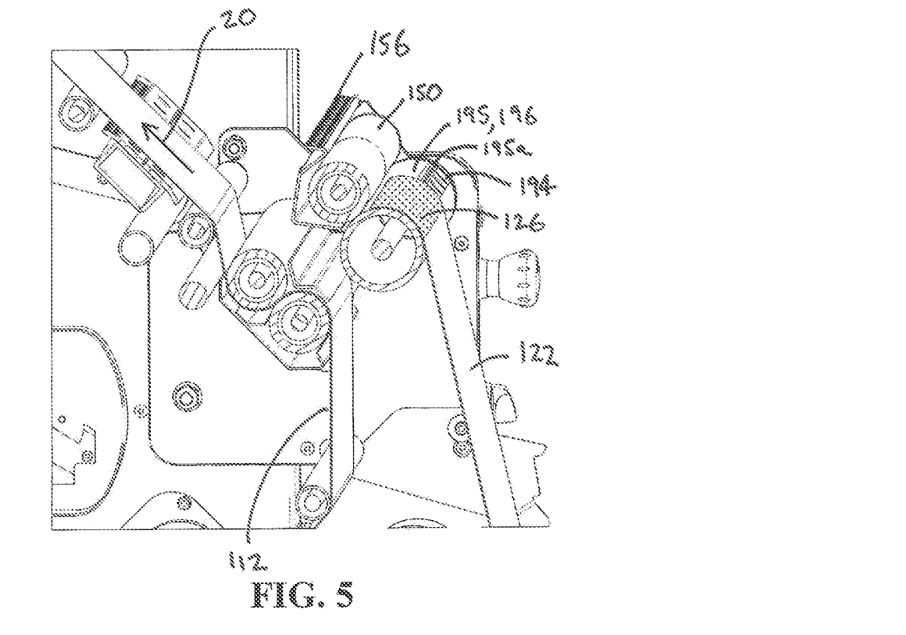
FIG. 5 shows a cut-away view of the splice mechanism of FIG. 1.

Preferably the second film 122 is positioned at a predetermined position on the vacuum roller 190. In this embodiment, a splice line 195a extends longitudinally between the vacuum strip and the adhesive release surface 195 providing a splice reference point. Preferably the second film end 124 is positioned such that registration marks on the second film are at a predetermined spacing from the splice line 195a. More preferably, the second film end 124 is then trimmed at the splice line 195a so that the second film does not overlay the adhesive release surface. Preferably, the adhesive tape 126 is applied with the adhesive side 126a facing the vacuum roller 190 spanning the second film end 124 which is held against the perforated surface 194, and the release surface 195 as can be seen in FIG. 5.

In this way, when the splice roller 150 moves from the free position towards the splice position, the splice roller 150 engages a side of the second film 122 that is opposite the adhesive side 126a of the adhesive tape 126. Furthermore, advantageously, the surface projections 196 on the adhesive release surface 195 provide limited surface area contact the adhesive surface of the tape 126 to the vacuum roller 190 surface to thereby reduce the bond therebetween.

Figure 6:
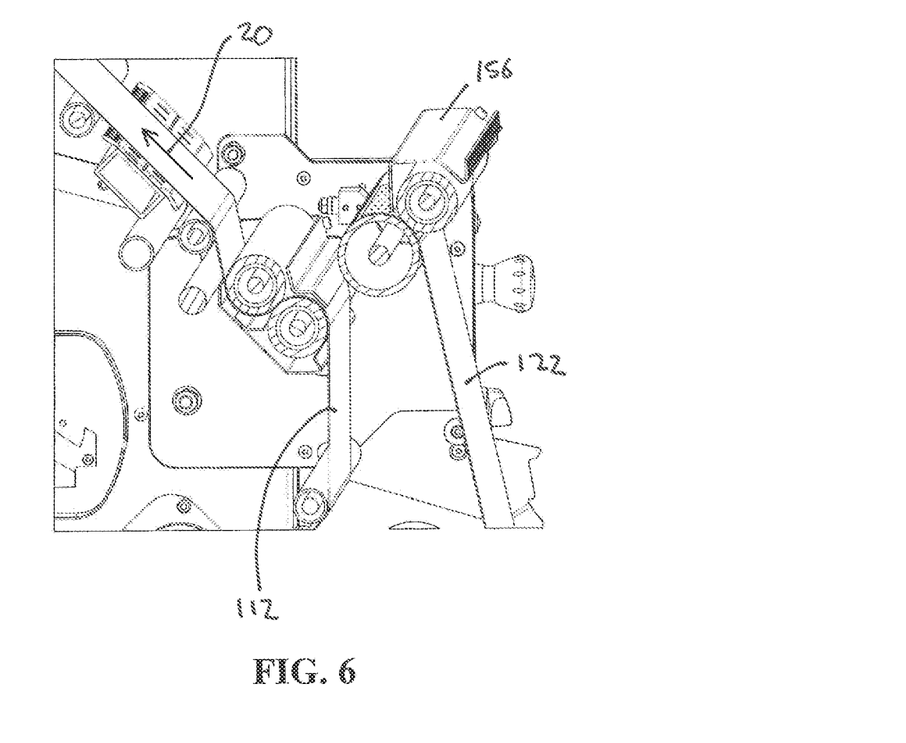
FIG. 6 shows a cut-away view of the splice mechanism of FIG. 1.
Figure 7:
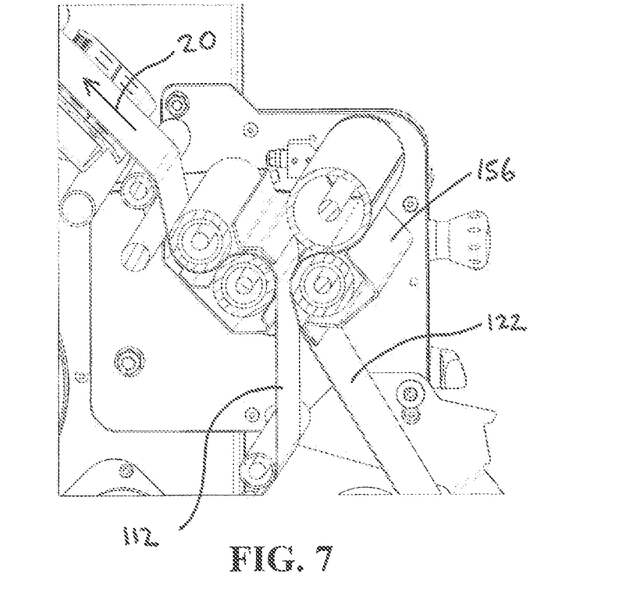
FIG. 7 shows a cut-away view of the splice mechanism of FIG. 1.

Preferably, the splice roller 150 is moved only partially from the free position toward the splice position, to a load position, such as seen in FIG. 7. The splice mechanism 100 includes a splice actuator 152 (see FIG. 3), to move the splice roller 150 from the load position to the splice position. Preferably, the splice roller 150 is manually movable between the free position and the load position. In this embodiment, the splice roller 150 moves from the free position relative to and around the circumference of the vacuum roller 190 to an intermediate position shown in FIG. 6 where the spice roller 150 is positioned generally over the vacuum strip 194. Over this initial portion of travel, the vacuum roller 190 is locked. From the intermediate position shown in FIG. 6, the splice roller 150 and the vacuum roller 190 rotate together around the central axis of the vacuum roller 190 to the load position shown in FIG. 7. The splice roller 150 also includes a splice roller shield 156 that moves with the splice roller 150 from the free position to the load position and to the splice position. The splice roller shield 156 allows access to the splice roller 150 in the free position and inhibits access to the splice roller 150 in the load position. Preferably, the splice roller shield 156 also inhibits access to the splice roller 150 in the splice position.

Figure 11:
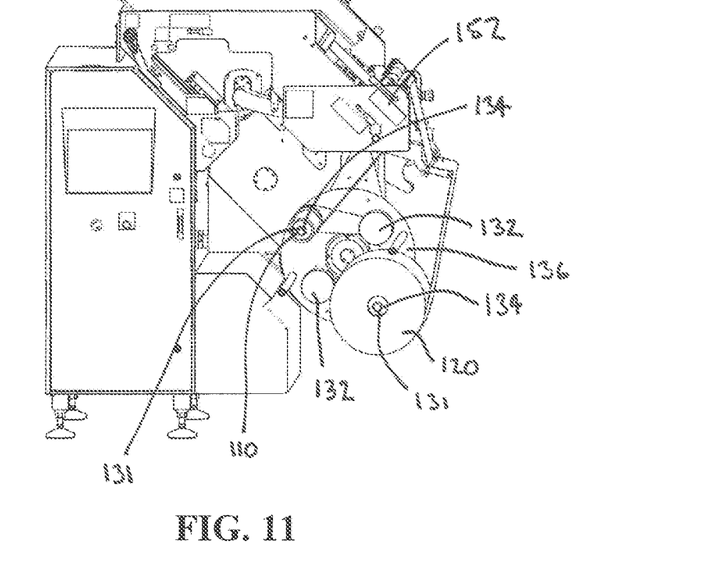
FIG. 11 shows a cut-away view of the splice mechanism of FIG. 1.
Figure 12:
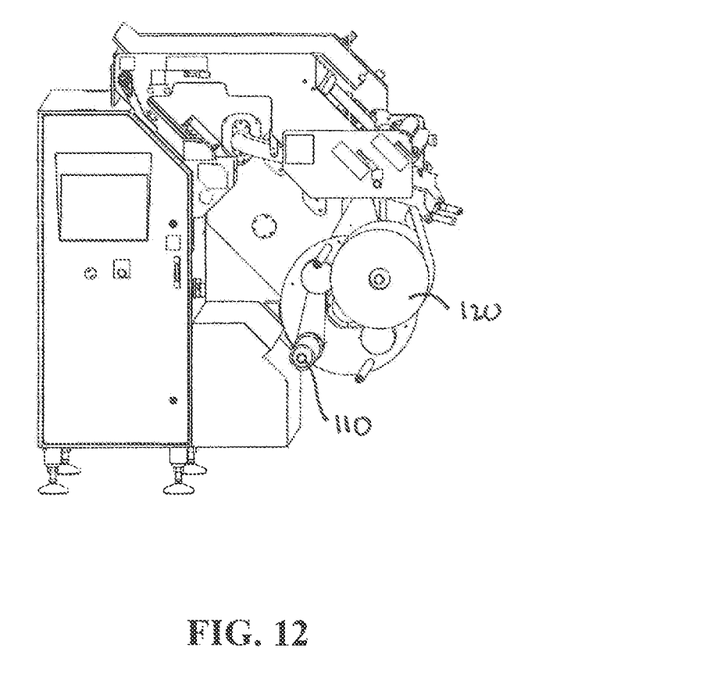
FIG. 12 shows a cut-away view of the splice mechanism of FIG. 1.
Figure 13:
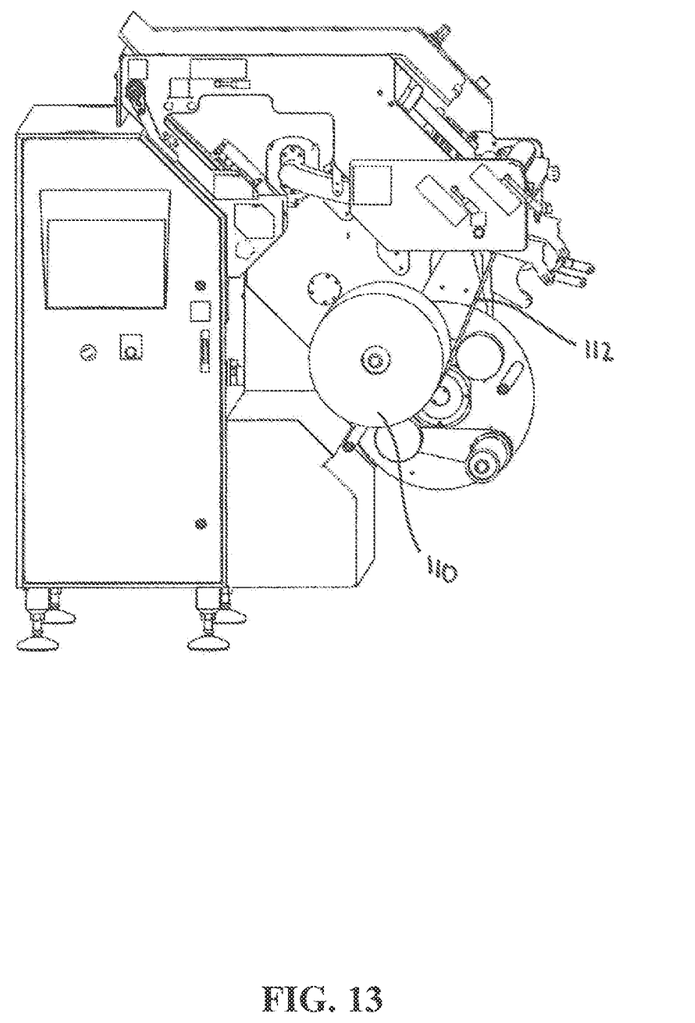
FIG. 13 shows a cut-away view of the splice mechanism of FIG. 1.

Turning to FIGS. 11 to 13, the film roll holder 130 includes a base plate 136 on which the film rolls 110, 120 are held, that is movable by a motor (not shown) such that the second film roll 120 is movable to a position previously occupied by the active film roll 110, thereby becoming the active film roll 110. The position of the active film roll 110 is comparatively inaccessible to the position of the second film roll which is comparatively accessible.

Use of the splice mechanism 100 will now be discussed.

Figure 14:
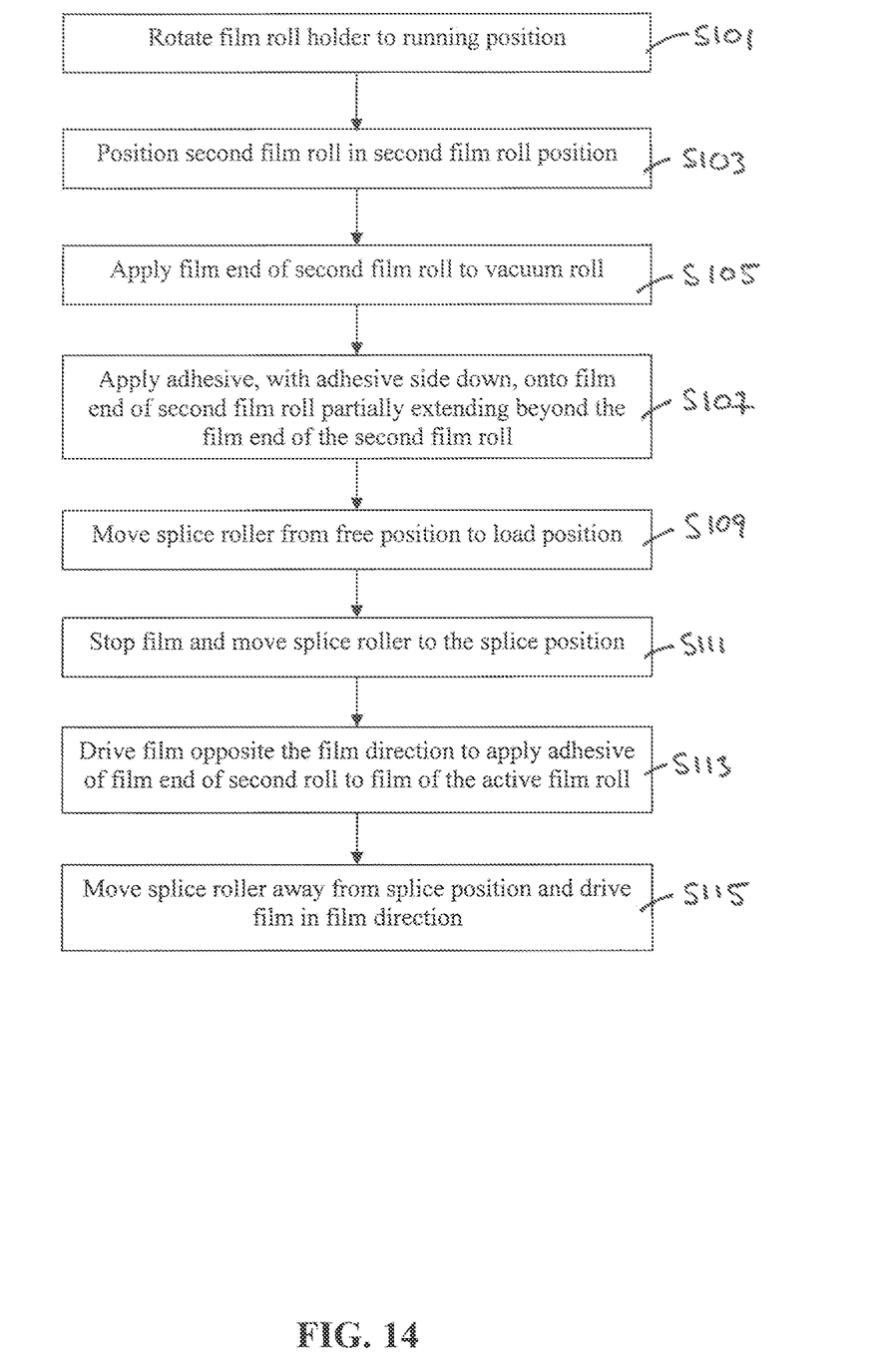
FIG. 14 shows a flow chart of a method of using the splice mechanism of FIG. 1.

Referring to FIG. 14, it is preferable to start the discussion from step S101, where the film roll holder 130 has been rotated to a running position, shown in FIG. 13, wherein the active film roll 110 is in the inaccessible position and the position for the second film roll 120 on the film roll holder 130 is accessible. In this position, as seen in FIG. 4, the active film 112 is driven in the film direction 20 by the first pinch drive mechanism 160. At step S103, the second film roll 120 is positioned in the second film roll position on the film roll holder 130. It is preferably at this point to ensure that the splice roller 150 is in the free position, as shown in FIG. 4.

At step S105, the second film end 124 is applied to the perforated surface 194 of the vacuum roll 190, as seen in FIG. 4, such that the second film end 124 is retained against the vacuum roller 190 by the pressure differential between the cavity 192 and ambient pressure. Preferably, the second film 122 is positioned on the vacuum roller 190 such that the registration marks on the second film 122 are at a predetermined position with respect to the vacuum and splice rollers 190, 150. In this embodiment for instance, the second film 122 is aligned on the vacuum roller 190 such that a lateral line midway between adjacent registration marks on the second film 122 is aligned with the splice line 195a on the vacuum roller 190. The second film 122 may then be trimmed such that the extreme edge of the second film 122 at the second film end 124 is positioned to align with the splice line 195a on the vacuum roller 190. In this way the position of the registration marks is at a predetermined position and as will be seen, the controller 14 may control splicing such that respective registration marks on the active and second films align.

At step S107 the adhesive tape 126 is applied to the second film end 124 with the adhesive side 126a down facing the vacuum roller 190, as shown in FIG. 5. The adhesive tape 126 should partially extend beyond the second film roll end 124 and onto the adhesive release surface 195.

At step S109 the splice roller 150 is moved from the free position to the load position, as shown in FIGS. 6 and 7. The second film 122 is now held between the vacuum roller 190 and the splice roller 150, as shown in FIG. 7, and the cavity 192 need no longer be maintained at a vacuum. Preferably, the vacuum source to the cavity 192 is deactivated by the controller when the splice roller 150 moves to the load position.

Step S111 occurs when the active film roll 110 is nearly depleted. To this end, the controller 14 is configured to determine when the active film roll 110 has run out of active film 112 by determining whether the spindle speed signal associated with the respective spindle 131 drops below a predetermined threshold. That is to say, once the active film roll 110 has run out of active film 112, the respective brake 132 slows the respective spindle 131. In alternative embodiments or a predetermined recognisable pattern signaling an end of the active film 112 is read by a sensor connected to the controller 14. The controller 14 then determines the film path 140 between the sensor point 144 and the splice point 142 based on at least predetermined information on the film path 140, such as a geometry of the packaging assembly 10. More preferably, the controller 14 bases the determination of the film path 140 at least on the arm signal, which is indicative of the length of the film path 140 through the film calendar 170. The controller 14 then determines a number of registration marks 116 between the splice point and the active film end 114 based, for example, the number of registration marks 116 that have passed the sensor point 144 since the spindle speed signal indicated that the active film roll 110 has run out of film, and the geometry of the splice mechanism 100, more specifically the distance between the active film roll 110 and the splice point 142.

When the number of registration marks between the splice point 142 and the active film end 114 is below a predetermined threshold, such as two registration marks, the controller 14 stops the first pinch drive mechanism 160 by controlling the servomotor driving first pinch roller 162. The controller then operates the splice actuator 152 to move the splice roller 150 from the load position to the splice position, as shown in FIG. 8. The active film 112 and the second film 122 are now held between the first pinch roller 162 and the splice roller 150. Preferably the controller operates the splice actuator 152 to move the splice roller 150 from the load position to the splice position so that respective registration marks on the active and second film rolls 112, 122 are generally aligned.

Figure 9:
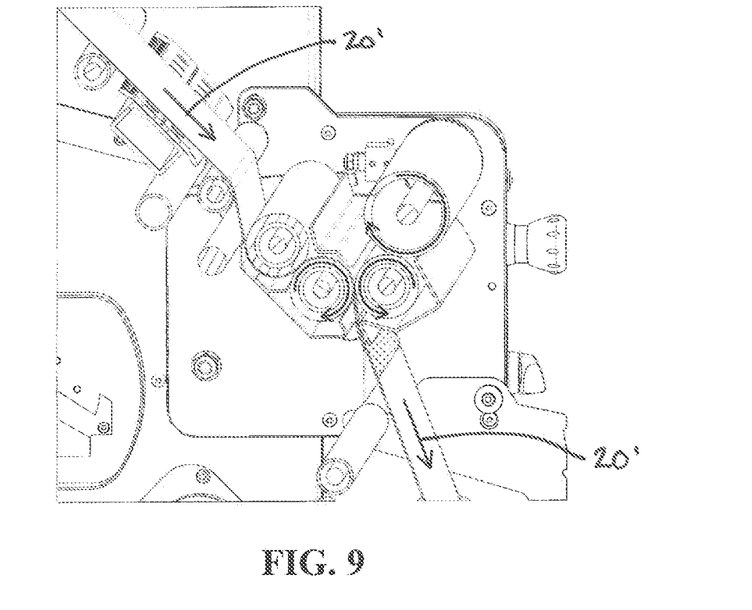
FIG. 9 shows a cut-away view of the splice mechanism of FIG. 1.

The controller 14 then drives the first pinch drive roller 162 such that the active film 112 and the second film 122 are driven in a direction 20' opposite the film direction 20, as shown in FIG. 9. As a result, the second film end 124 is drawn between the first pinch drive roller 162 and the splice roller 150, the pressure between the rollers 162, 150 applying the adhesive tape 126 to the active film 112. During this operation, and more specifically when the splice roller 150 is moved to the splice position, the calendar arm 176 moves along the arm path 178 to reduce the length of the film path 140 through the film calendar 170 such that the film speed through the second pinch drive mechanism 180 is at least higher than the film speed at the splice point 142. It is contemplated that even when the active film 112 travels in the opposite film direction 20', depletion of film 112 from the film calendar 170 allows the film to be driven by the second pinch drive 190 to keep travelling in the film direction 20 for feeding to the former shoulder 12 for continued bagging operation thereof.

Figure 10:
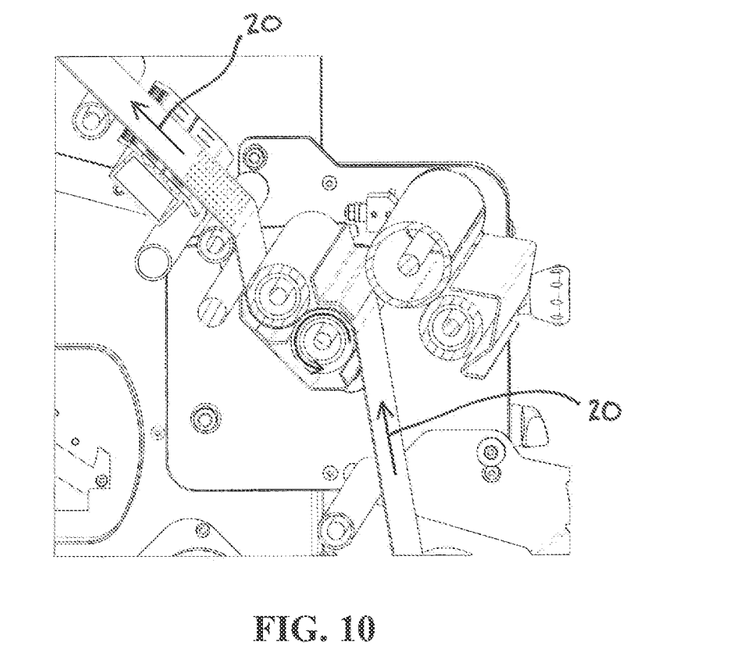
FIG. 10 shows a cut-away view of the splice mechanism of FIG. 1.

Following operation of the first pinch drive roller 162 for a predetermined tangential distance, the splice actuator 152 is operated by the controller 14 to move the splice roller 150 back to the load position, or the free position, and the first pinch drive roller 162 is reversed to drive the second film 122 in the film direction 20, as shown in FIG. 10. Rotation of the film roll holder 130, as shown in FIGS. 11 to 13 turns the second film roll 120 into the active film roll 110 and the process is ready to repeat.

Advantages of the splice mechanism 100 will now be discussed.

Due to the use of the splice roller 150 to apply the second film end 124 with the adhesive tape 126 to the active film 112, film cutting is not required to perform the splice and the splicing progress can be automated without the need for an operator to attend to the packaging assembly 10. The reverse drive of the first pinch roller 162 to apply the adhesive tape 126 between the roller 162 and the splice roller 150 ensures a good adhesion between the active film 112 and the second film 122. The use of the film calendar 170 allows active film 112 to continue to fed to the former shoulder 12, such that product that has already been dispensed for bagging can continue to be bagged, rather than being lost due to the non-availability of active film 112. Similarly, the bagging process can continue, even at speed, while the active film 112 is being spliced with the second film 122.

The determination of the registration marks 116 between the splice point 142 and the end of the active film 112 allows a known quantity of trailing active film 112 to be double layered with the second film 122. This trailing active film 112 can be traced through the machine and ejected by making a bag without dispensing product that fills it, and then marking the bag to be rejected further down the assembly line.

The use of the vacuum roller 190 assists the manual preparation of the second film end 124 with the adhesive tape 126. The use of the splice roller 150 together with the vacuum roller 190 means that vacuum pressure is only required when applying the adhesive tape 126, not during the normal running of the packaging assembly 10, greatly reducing power use and operating noise of the packaging assembly 10. The use of the splice actuator 152 allows automation of the splice action once the second film end 124 has been prepared using the vacuum roller 190.

Furthermore, advantageously, the surface projections 196 on the adhesive release surface 195 provide limited surface area contact the adhesive surface of the tape 126 to the vacuum roller 190 surface reducing the adhesion between the adhesive tape 126 and the vacuum roller 190 so that the adhesive tape 126 may be released from the vacuum roller to be applied to the second film 122.

The use of the splice roller shield 156 protects operators from the automated movement of the splice actuator 152, and the pinch points present in the first pinch drive mechanism 160. Similarly, the accessibility of the position of the second film roll 120 reduces the need for operators to reach into the packaging assembly 10 or the splice mechanism 100 and be exposed to pinch points.

All of the above advantageously automate or at least semi-automate roll replacement to reduce downtime of the machine. More particular, an operator is not required to be present at the time the active film roll is depleted. Rather, the second film roll may be set in reserve and the splice mechanism 100 will splice the second film roll at the required time.

Although the invention has been described with reference to a preferred embodiment, it will be appreciated by those skilled in the art that the invention may be embodied in other forms.

The advantageous embodiments and/or further developments of the above disclosure—except for example in cases of clear dependencies or inconsistent alternatives—can be applied individually or also in arbitrary combinations with one another.

| | |
|---|---|
| 10 | packaging assembly |
| 12 | former shoulder |
| 14 | controller |
| 16 | belt drive |
| 18 | film |
| 20 | film direction |
| 22 | tubular film |
| 24 | sealing device |
| 26 | first sealing direction |
| 28 | set of jaws |
| 30 | second sealing direction |
| 32 | first seal |
| 34 | second seal |
| 36 | bag |
| 100 | splice mechanism |
| 110 | active film roll |
| 112 | active film |
| 114 | active film end |
| 116 | registration marks |
| 120 | second film roll |
| 122 | second film |
| 124 | second film end |
| 126 | adhesive |
| 126a | open side |
| 130 | film roll holder |
| 131 | spindle |
| 132 | brake |
| 134 | spindle speed sensor |
| 136 | base plate |
| 140 | film path |
| 142 | splice point |
| 144 | sensor point |
| 150 | splice roller |
| 152 | splice actuator |
| 154 | registration mark sensor |
| 156 | splice roller shield |
| 160 | first pinch drive mechanism |
| 162 | first pinch roller |
| 164 | second pinch roller |
| 165 | sensor |
| 170 | film calendar |
| 172 | set of stationary rollers |
| 174 | set of movable rollers |
| 176 | movable calendar arm |
| 178 | arm path |
| 180 | second pinch drive mechanism |
| 182 | first pinch roller |
| 184 | second pinch roller |
| 185 | sensor |
| 190 | vacuum roller |
| 192 | cavity |
| 194 | perforated surface |
| 194a | dotted line (vacuum strip) |
| 195 | adhesive release surface |
| 195a | splice line |
| 196 | raised surface feature |

The invention claimed is:

1. A splice mechanism for a packaging assembly, the packaging assembly including:

a former shoulder;

a controller;

a belt drive controlled by the controller for feeding a film at a film speed to the former shoulder to form a tubular film moving in a film direction;

a sealing device to seal the tubular film in a first sealing direction, the first sealing direction being parallel to the film direction; and a set of jaws controlled by the controller and movable at a jaw speed to engage and seal the tubular film in a second sealing direction to form a first seal and a second seal in each bag, thereby forming a closed bag, the splice mechanism comprising:

a film roll holder for holding an active film roll from which film is drawn to be fed to the former shoulder and a second film roll having film for feeding to the former shoulder, wherein film from the active film roll extends along a film path to the former shoulder and the second film roll is accessible; and a splice roller against which film from the second film roll is placed, the film having a film end, the film end having an adhesive, the splice roller being movable between a free position, wherein the film path is unimpeded by the splice roller, and a splice position, wherein the film path is tangential to the splice roller at a splice point on the film path;

wherein the splice mechanism further includes a first pinch drive mechanism locatable along the film path between the active film roll and the former shoulder, the first pinch drive mechanism having a first pinch roller and a second pinch roller positioned such that the first pinch roller and the second pinch roller engage and draw the film from the active film roll at the film speed, wherein, when the splice roller is in the splice position, the splice roller and the first pinch roller are adjacent each other such that the film of the active film roll and the film of the second film roll is engaged by the splice roller and the first pinch roller, and wherein, when the splice roller is in the splice position, the first pinch drive mechanism drives the film opposite the film direction.

2. The splice mechanism of claim 1, wherein the splice mechanism further includes:
- a film calendar locatable between the active film roll and the former shoulder having a set of stationary rollers, and a set of movable rollers that are mounted on a movable calendar arm, with the film path rounding the set of stationary rollers and the set of movable rollers alternatingly such that movement of the calendar arm along an arm path changes a length of the film path through the film calendar, and
- a second pinch drive mechanism locatable between the film calendar and the former shoulder, the second pinch drive mechanism having a first pinch roller and a second pinch roller positioned such that the first pinch roller and the second pinch roller engage and draw the film from the film calendar,
- wherein, when the splice roller is moved to the splice position, the calendar arm moves along the arm path to reduce the length of the film path through the film calendar as film is fed to the former shoulder, such that the film speed through the second pinch drive mechanism is higher than the film speed at the splice point.

3. The splice mechanism of claim 2, wherein the splice roller is further movable to a load position between the free position and the splice position, and
- the film includes a set of regularly spaced registration marks and the splice mechanism further includes:
- a splice actuator to move the splice roller between the load position and the splice position;
- a registration mark sensor locatable between the film calendar and the former shoulder, the registration mark sensor configured to provide a registration signal to the controller, the registration signal being indicative of whether a registration mark of the set of regularly spaced registration marks is present on the active film at a sensor point on the film path adjacent the registration mark sensor;
- a film roll spindle mounted on the film roll holder for supporting the active film roll;
- a brake associated with the film roll spindle to resist the drawing of film from the active film roll; and
- a speed sensor associated with the film roll spindle configured to provide a spindle speed signal to the controller, the spindle speed signal being indicative of a rotational speed of the active film roll,
- wherein the controller is configured to:
  - determine when the active film roll has run out of film by determining whether the spindle speed signal drops below a predetermined threshold;
  - determine the film path between the sensor point and the splice point based on at least predetermined information on the film path; and
  - determine a number of registration marks on the active film between the splice point and a film end of the film previously drawn from the active film roll;
  - operate the splice actuator to move the splice roller from the load position to the splice position when the number of registration marks between the splice point and the film end is below a predetermined threshold.

4. The splice mechanism of claim 3, wherein the film calendar further includes an arm sensor adapted to provide an arm signal to the controller, the arm signal being indicative of a position of the movable calendar arm along the arm path, and
- wherein the controller is configured to determine the film path between the registration sensor point and the splice point based on at least the calendar arm position along the arm path.

5. The splice mechanism of claim 4, wherein the controller is adapted to determine the position of the set of registration marks on the active film along the film path and operate the splice actuator to move the splice roller from the load position to the splice position to align the registration marks on the active film with a known position of registration marks on the second film.

6. The splice mechanism of claim 1, wherein the splice mechanism further includes a vacuum roller positioned between the free position and the splice position of the splice roller such that the splice roller moves circumferentially about the vacuum roller between the free position and the splice position,
- wherein the vacuum roller includes a cavity that is maintained at lower than ambient pressure, and a perforated surface in fluid communication with the cavity, wherein the perforated surface is adapted to retain the film end against the vacuum roller while the adhesive is applied to the film end.

7. The splice mechanism of claim 6, wherein the splice roller is further movable to a load position between the free position and the splice position, and wherein
- the vacuum roller includes an adhesive release surface adjacent the perforated surface; and
- the adhesive is an adhesive tape having an adhesive side and a non-adhesive side, wherein the adhesive tape is applied with the adhesive side facing the vacuum roller to span the film end retained against the vacuum roller and the release surface and, when the splice roller is moved from the free position to the load position, the splice roller engages a side of the film that is opposite the adhesive side of the adhesive.

8. The splice mechanism of claim 7, wherein the splice roller is manually movable between the free position and the load position, and
- wherein the splice mechanism includes a splice actuator to move the splice roller between the load position and the splice position.

9. The splice mechanism of claim 7, wherein the adhesive release surface includes a plurality of raised surface features.

10. The splice mechanism of claim 9, wherein the plurality of raised surface features includes cylindrical hemispherical or semi-hemispherical bosses of about 0.2 mm to 5 mm height and 0.2 mm to 5 mm diameter.

11. The splice mechanism of claim 7, wherein the adhesive release surface includes a silicone surface.

12. The splice mechanism of claim 1, wherein the splice mechanism further includes a splice roller shield that moves with the splice roller to allow access to the splice roller in the free position and inhibit access to the splice roller in the splice position.

13. The splice mechanism of claim 1, wherein the film roll holder is movable such that the second film roll is movable to a position previously occupied by the active film roll, thereby becoming the active film roll.

14. The splice mechanism of claim 13, wherein a position occupied by the second film roll is comparatively accessible and the position occupied by the active film roll is comparatively inaccessible.

15. A packaging assembly comprising:
a former shoulder; and
a splice mechanism, the splice mechanism including:
a film roll holder for holding an active film roll from which a film is drawn to be fed to a former shoulder and a second film roll having a film for feeding to the former shoulder, wherein the film from the active film roll extends along a film path to the former shoulder and the second film roll is accessible; and
a splice roller against which a film from the second film roll is placed, the film having a film end, the film end having an adhesive, the splice roller being movable between a free position, wherein the film path is unimpeded by the splice roller, and a splice position, wherein the film path is tangential to the splice roller at a splice point on the film path;
wherein the splice mechanism further includes a first pinch drive mechanism locatable along the film path between the active film roll and the former shoulder, the first pinch drive mechanism having a first pinch roller and a second pinch roller positioned such that the first pinch roller and the second pinch roller engage and draw the film from the active film roll at a film speed,
wherein, when the splice roller is in the splice position, the splice roller and the first pinch roller are adjacent each other such that the film of the active film roll and the film of the second film roll is engaged by the splice roller and the first pinch roller, and
wherein, when the splice roller is in the splice position, the first pinch drive mechanism drives the film opposite the film direction.

\* \* \* \* \*